US010427697B2

(12) United States Patent
Bramlett

(10) Patent No.: US 10,427,697 B2
(45) Date of Patent: Oct. 1, 2019

(54) RAIL PRESSURE ADJUSTMENT ASSEMBLY AND SYSTEM FOR RAIL VEHICLES

(71) Applicant: NORDCO INC., Oak Creek, WI (US)

(72) Inventor: Pat Bramlett, Overland Park, KS (US)

(73) Assignee: NORDCO INC., Oak Creek, WI (US)

(*) Notice: Subject to any disclaimer, the term of this patent is extended or adjusted under 35 U.S.C. 154(b) by 240 days.

(21) Appl. No.: 15/641,248

(22) Filed: Jul. 4, 2017

(65) Prior Publication Data
US 2019/0009805 A1 Jan. 10, 2019

(51) Int. Cl.
B61F 5/38 (2006.01)
B61C 11/00 (2006.01)
B61J 3/12 (2006.01)
B61K 9/12 (2006.01)
B61L 27/04 (2006.01)
B61L 3/00 (2006.01)
B61L 15/00 (2006.01)
B60F 1/04 (2006.01)

(52) U.S. Cl.
CPC .............. B61F 5/38 (2013.01); B60F 1/04 (2013.01); B61C 11/005 (2013.01); B61J 3/12 (2013.01); B61K 9/12 (2013.01); B61L 3/006 (2013.01); B61L 15/0081 (2013.01); B61L 27/04 (2013.01); B61L 2201/00 (2013.01)

(58) Field of Classification Search
CPC ...... B61F 5/38; B61F 5/44; B61F 9/00; B61L 3/006; B60F 1/04; B61J 3/12
USPC ............. 701/19, 41; 105/199.2, 215.1, 215.2
See application file for complete search history.

(56) References Cited

U.S. PATENT DOCUMENTS

| 3,345,746 | A | 10/1967 | Plasser et al. | |
| 4,103,547 | A | 8/1978 | Vrabel | |
| 4,202,276 | A * | 5/1980 | Browne | B60F 1/046 105/165 |
| 4,355,582 | A * | 10/1982 | Germer | B61F 5/02 105/164 |
| 4,880,190 | A | 11/1989 | Austill et al. | |
| 5,012,413 | A | 4/1991 | Sroka et al. | |
| 5,943,962 | A * | 8/1999 | Birkhahn | B61F 5/245 105/199.2 |
| 7,164,975 | B2 | 1/2007 | Bidaud | |

(Continued)

FOREIGN PATENT DOCUMENTS

RU 2207274 C2 6/2003

Primary Examiner — Zachary L Kuhfuss
(74) Attorney, Agent, or Firm — Greer, Burns & Crain, Ltd.

(57) ABSTRACT

A rail vehicle including a wheel assembly having wheels configured to traverse rails of a railroad track, a controller having a processor in communication with the wheel assembly, and a non-transitory computer readable medium, disposed on the vehicle, and containing instructions, which, cause the following steps in real-time as the vehicle traverses the rails: determine a rail pressure of the wheels on the rails, determine a degree of curvature of the rails as the vehicle moves along the railroad track, determine a minimum rail pressure of the wheels on the rails based on the degree of curvature, determine if the rail pressure is equal to or greater than the minimum rail pressure and adjust the rail pressure of the wheels on the rails to be the minimum rail pressure when the rail pressure is less than the minimum rail pressure to maintain stability of the vehicle on the railroad track.

11 Claims, 7 Drawing Sheets

(56) References Cited

U.S. PATENT DOCUMENTS

| | | | |
|---|---|---|---|
| 8,249,776 B2* | 8/2012 | Reimann | B61F 5/383 |
| | | | 701/41 |
| 8,276,522 B2 | 10/2012 | Simson | |
| 8,356,557 B2* | 1/2013 | Schneider | B61F 5/24 |
| | | | 105/199.2 |
| 8,511,238 B2* | 8/2013 | Kikko | B61F 5/44 |
| | | | 105/157.1 |
| 8,776,696 B2* | 7/2014 | Okubo | B61F 5/526 |
| | | | 105/158.2 |
| 8,899,160 B2* | 12/2014 | Haas | B61F 5/22 |
| | | | 105/199.2 |
| 9,643,622 B2* | 5/2017 | Maeyama | B61B 13/00 |
| 9,688,293 B2* | 6/2017 | Ozaki | B61F 5/44 |
| 2002/0035947 A1* | 3/2002 | Sebata | B61F 5/22 |
| | | | 105/199.2 |
| 2009/0276107 A1* | 11/2009 | Reimann | B61F 5/383 |
| | | | 701/19 |
| 2013/0087067 A1* | 4/2013 | Bodell | B60F 1/043 |
| | | | 105/215.2 |
| 2013/0319284 A1* | 12/2013 | Shinmura | B61C 17/00 |
| | | | 105/453 |
| 2014/0261062 A1* | 9/2014 | Ozaki | B61F 5/44 |
| | | | 105/168 |
| 2015/0353104 A1 | 12/2015 | Maeyama et al. | |
| 2017/0151847 A1* | 6/2017 | Letukas | B60F 1/04 |

\* cited by examiner

RAIL PRESSURE ADJUSTMENT ASSEMBLY AND SYSTEM FOR RAIL VEHICLES

BACKGROUND

The present invention relates to an apparatus that adjusts operating parameters of railroad vehicles while moving along a track, and more specifically, to an apparatus that adjusts the rail pressure exerted by railroad vehicles moving along a track based on the curvature of the track.

In the railroad industry, railcar movers are used to move and connect railcars to each other and between locomotives. The railcar movers, which are configured with two sets of wheels (one set of steel wheels and one set of rubber wheels) to travel on both roads and railroad tracks, include couplers to connect to and move small numbers of rail cars around in a rail yard or other similar location. Railcar movers are preferred by railroad operators for these operations because they are less expensive than a locomotive, more convenient and less costly than paying the railroad operator to do the switching, easier and more productive than manually moving the railcars, and are more versatile since these vehicles can travel on road wheels to the railcars that need to be moved, instead of requiring a clear railroad track. Further, railcar movers are typically smaller than locomotives, which allows them to quickly and easily maneuver and move around obstacles at a rail yard to access the rail cars.

The configuration of the railroad track that the railcar movers travel on varies based on terrain. For example, the railroad track may have a steep incline or decline in mountainous areas or be generally level when on flat ground. Additionally, railroad track includes combinations of straight portions and curves to accommodate obstacles such as buildings, mountains, trees and the like, to pass through tunnels and to move rail cars to a particular location such as a shipping dock.

Locomotives that travel on railroad track are sufficiently large and heavy to maintain consistent pressure between the wheels and the rails of the track during movement through curves to help prevent the wheels of the locomotive and the railcars from riding up on the rails, i.e., rail climb, and derailing the locomotive and/or railcars. Railcar movers are smaller and lighter than locomotives and therefore are more susceptible to rail climb on the rails during the maneuvering of one or more larger and heavier rail cars, and particularly when moving through curves in the track.

Formulas, such as the Nadal and Wagner formulas, are well known in the railroad industry for determining wheel climb. These formulas are specific to the geometry of each rail vehicle and require advance knowledge of the configuration and dimensional parameters of the railroad track that the rail vehicles will be travelling on. As such, this method of determining wheel climb for rail vehicles is burdensome and time-consuming.

Thus, there is a need for an apparatus for rail movers that automatically adjusts the operating parameters of a rail mover to overcome wheel climb and maintain stability of the rail mover while traversing a railroad track.

SUMMARY

Accordingly, the above-listed needs are met or exceeded by the present rail vehicle, that in an embodiment, includes a wheel assembly having wheels configured to traverse rails of a railroad track, a controller having a processor in communication with the wheel assembly, and a non-transitory computer readable medium, disposed on the rail vehicle, and containing instructions, which when executed by the processor, causes performance of the following steps in real-time as the rail vehicle traverses the rails: determine a rail pressure of the wheels on the rails, determine a degree of curvature of the rails as the rail vehicle moves along the railroad track, determine a minimum rail pressure of the wheels on the rails based on the degree of curvature, determine if the rail pressure is equal to or greater than the minimum rail pressure and adjust the rail pressure of the wheels on the rails to be the minimum rail pressure when the rail pressure is less than the minimum rail pressure to maintain stability of the rail vehicle on the railroad track.

Another embodiment provides a method of adjusting a rail pressure of wheels of a rail vehicle on a railroad track during movement of the rail vehicle, the method including automatically performing the steps of: determining a rail pressure of the wheels on rails of the railroad track, determining a degree of curvature of the rails as the rail vehicle traverses the railroad track, determining a minimum rail pressure of the wheels on the rails based on said degree of curvature, determining if the rail pressure is equal to or greater than said minimum rail pressure, and adjusting the rail pressure of the wheels on the rails to be said minimum rail pressure when said rail pressure is less than the minimum rail pressure to maintain stability of the rail vehicle on the railroad track.

DETAILED DESCRIPTION

Figure 1:
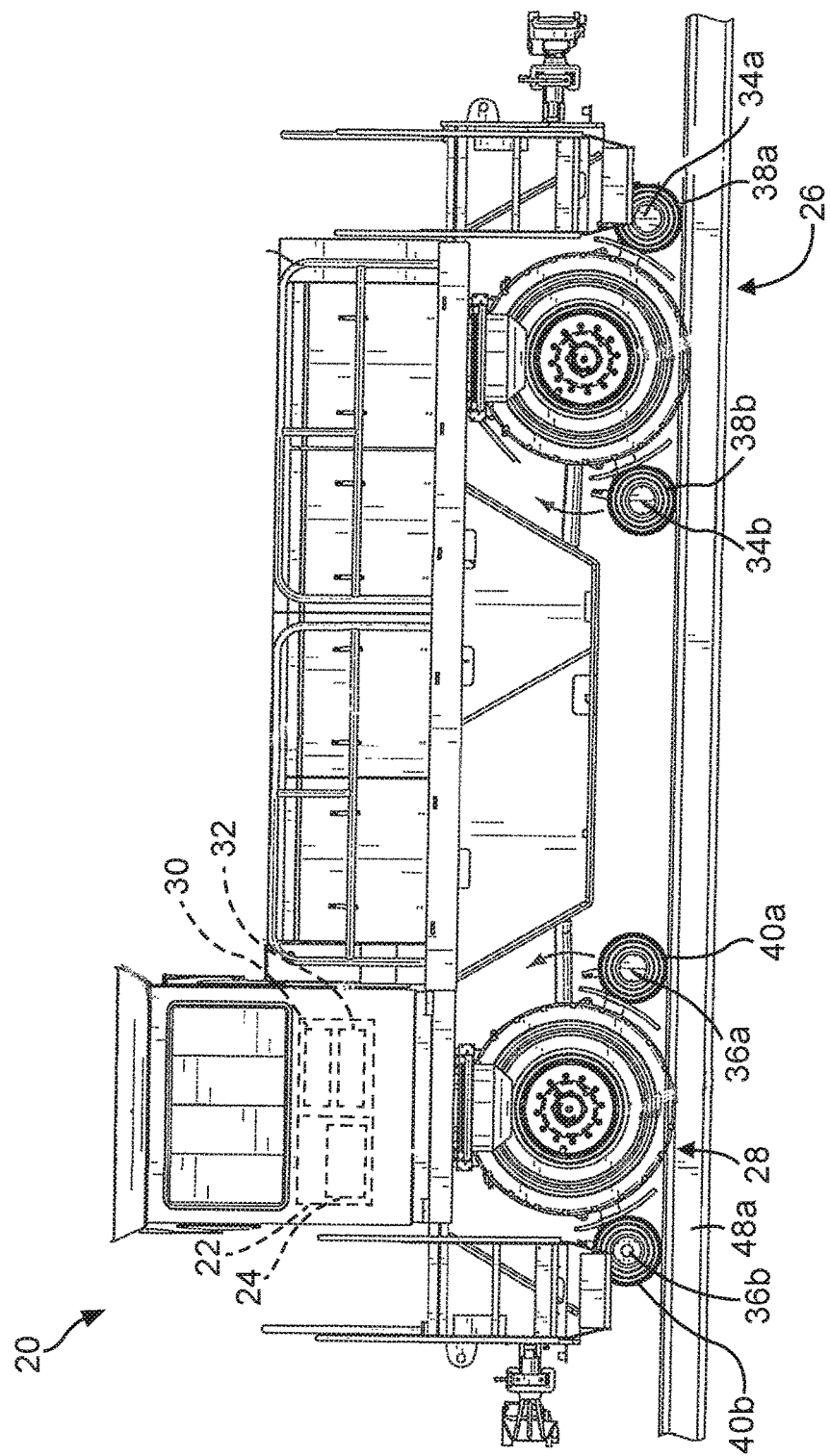
FIG. 1 is an elevation view of an embodiment of a rail vehicle employing the present rail pressure adjustment system.
Figure 2:
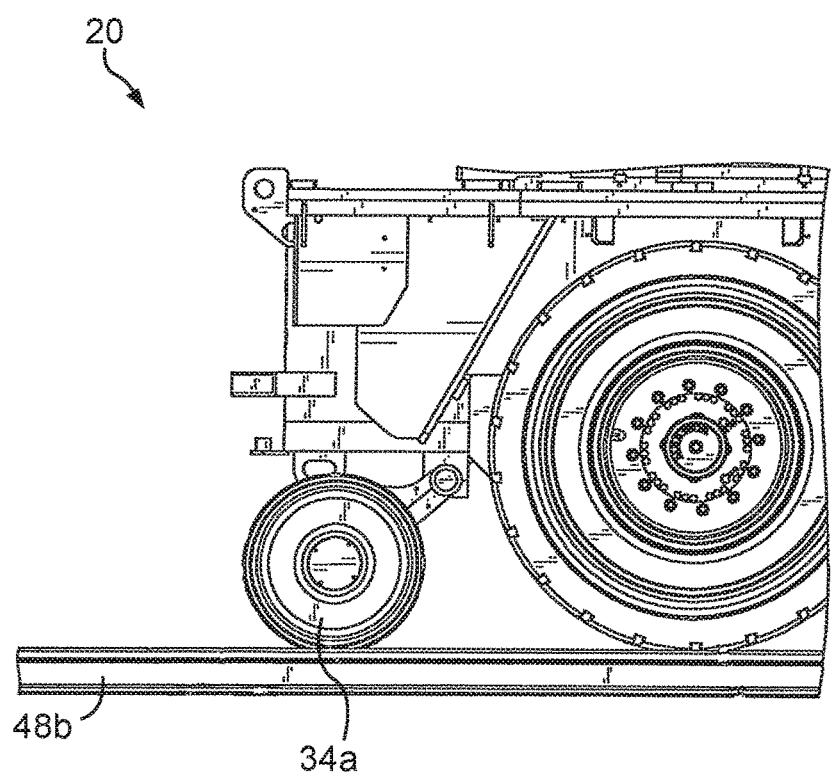
FIG. 2 is an enlarged fragmentary elevation view of the rail vehicle of FIG. 1.
Figure 3:
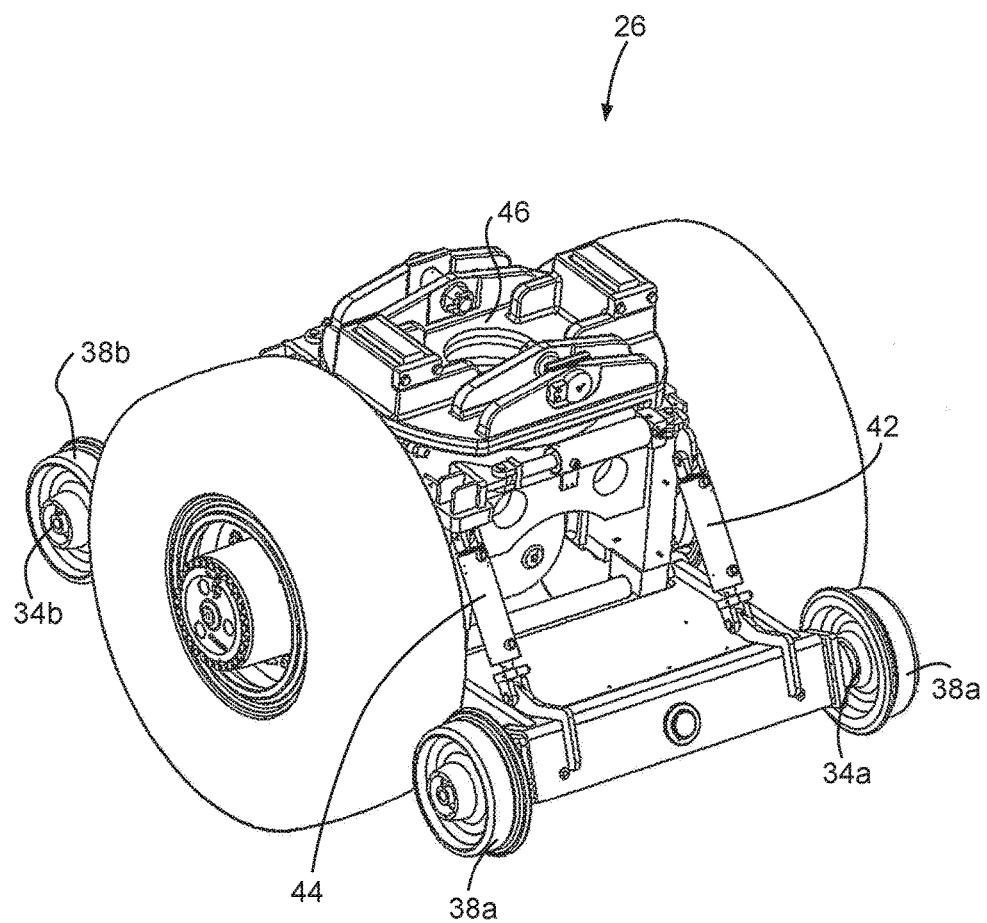
FIG. 3 is a perspective view of an axle and wheel assembly of the rail vehicle of FIG. 1.
Figure 4:
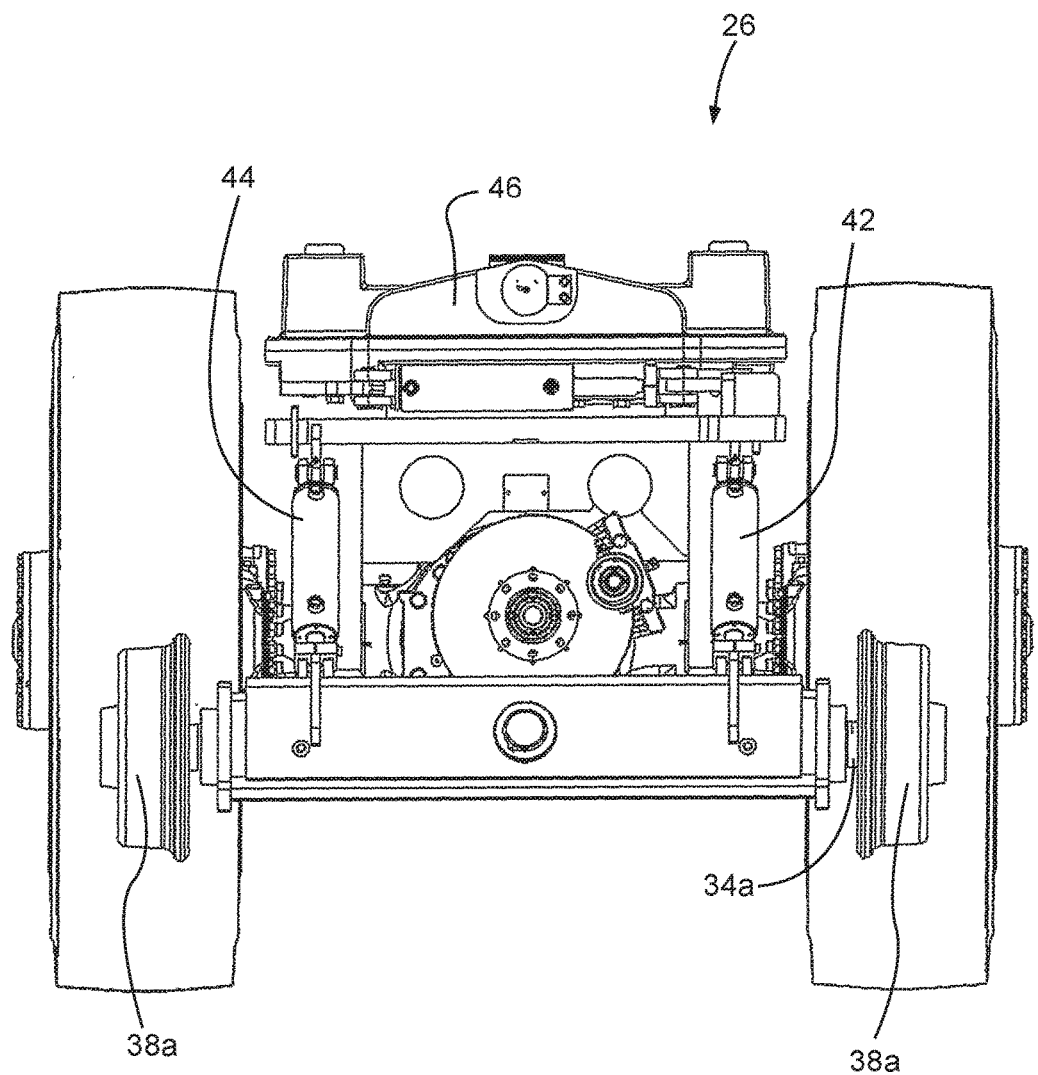
FIG. 4 is a front view of the axle and wheel assembly of FIG. 3.
Figure 5:
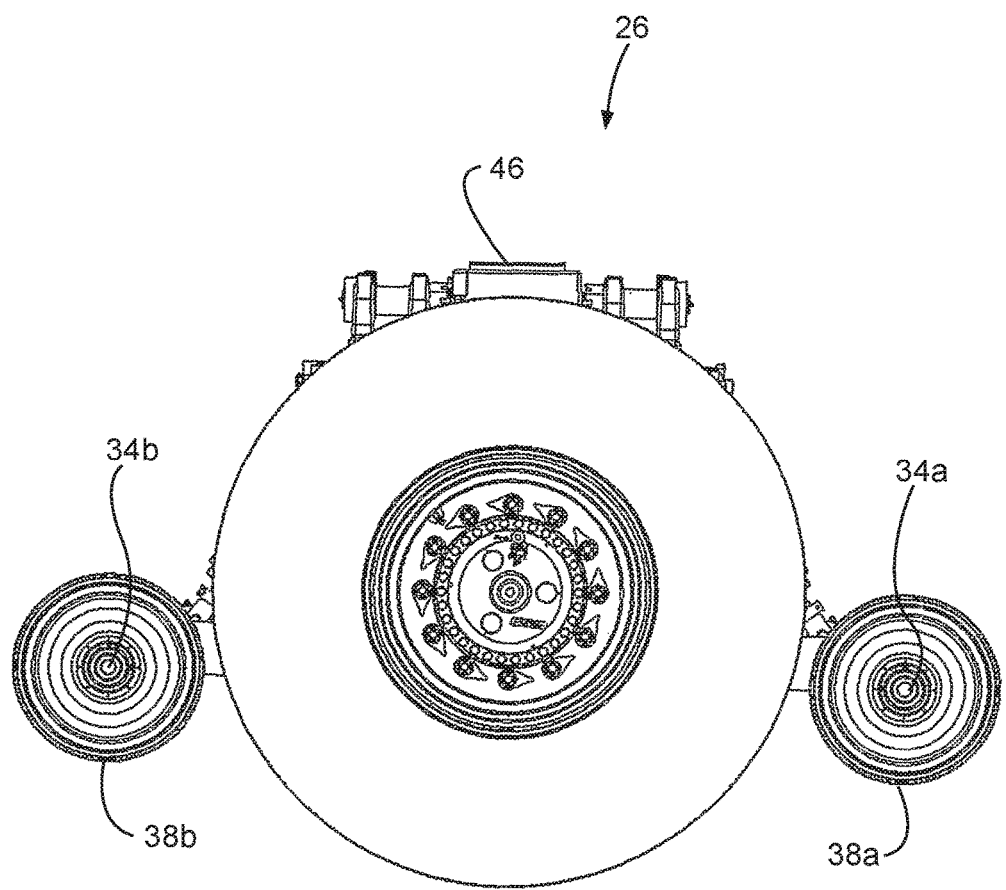
FIG. 5 is a side view of the axle and wheel assembly of FIG. 3.
Figure 6:
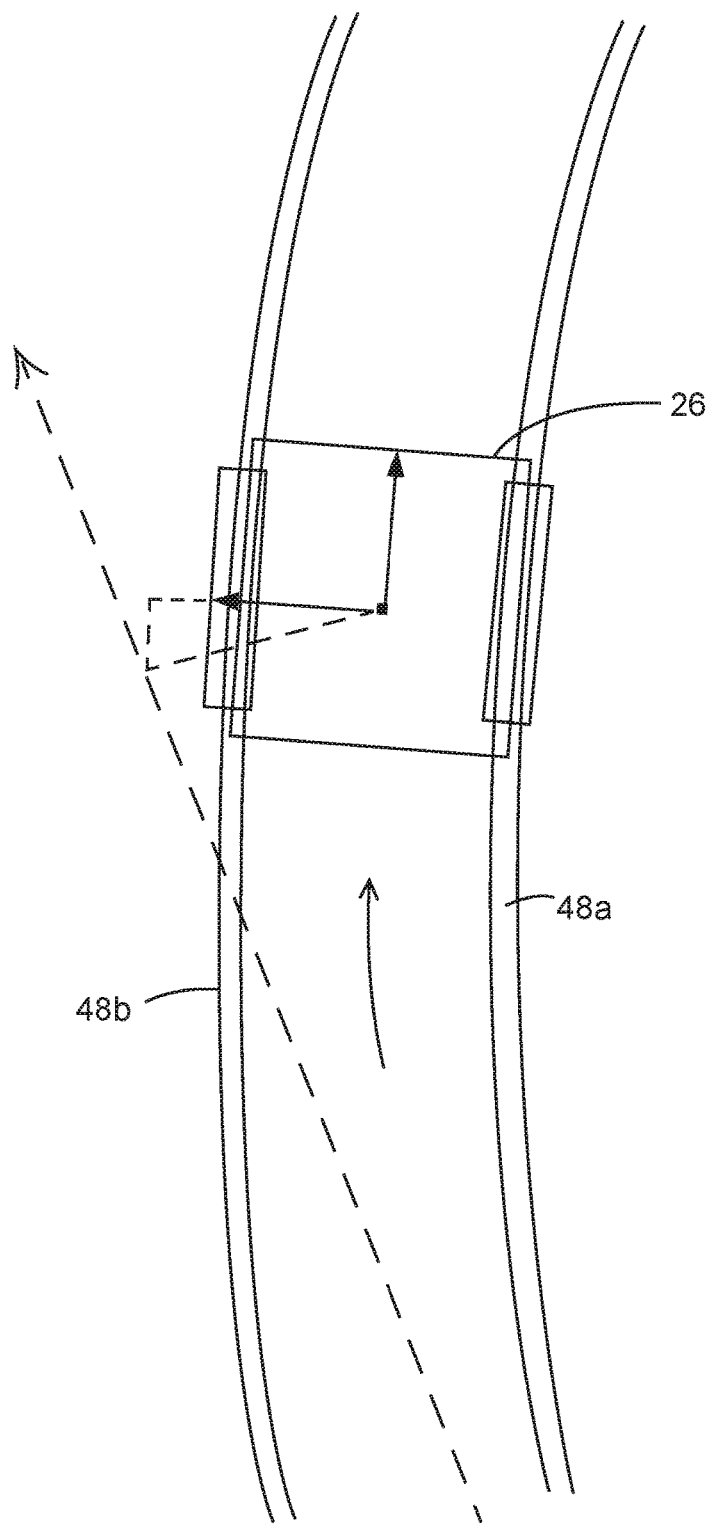
FIG. 6 is a schematic view of the axle and wheel assembly of a rail vehicle moving through a curve in a railroad track showing the force vectors.

The present rail pressure adjustment assembly and system automatically controls the rail pressure of a rail vehicle on the rails of a railroad track to help reduce wheel climb on the rails, particularly as the rail vehicle traverses a curved portion of the track. Wheel climb is caused by a lateral force of the wheels on the rails during movement of the rail vehicle that allows the wheels to ride up or move up the rails despite a downward force by the rail vehicle on the rails. Such movement of the wheels upwardly on the rails can lead to derailment of the rail vehicle resulting in damage to the rail vehicle and any rail cars coupled to the rail vehicle, as well as increased costs associated with the damage and time that the rail vehicle and rail cars are out of service.

To overcome the effects of rail climb by the wheels, the present rail pressure adjustment system automatically adjusts that rail pressure of the rail vehicle, and more specifically, the rail pressure of the wheels on the rails to counteract the lateral force of the wheels on the rails during movement of the rail vehicle on a track. The effect of rail climb is a particular problem when the rail vehicle moves through or traverses a curve or curved portion of a track as this is where the lateral forces of the wheels on the rails increase. Therefore, there are several parameters and dimensions associated with the rail vehicle and the track that must be taken into account to determine the minimum rail pressure needed at a particular curved portion of the track to overcome the lateral forces of the wheels, i.e., rail climb, on the rails of the track.

Referring to FIGS. 1-7, a rail vehicle, generally designated by reference number 20, includes a controller 22 having a processor 24, a front wheel assembly 26 and a rear wheel assembly 28, where the processor is in communication with the front and rear wheel assemblies. Data related to the operation of the rail vehicle and the rails traversed by the rail vehicle are stored in a memory device 30 that is disposed on the rail vehicle 20 and in communication with the processor 24. A non-transitory computer readable medium 32 is disposed on the rail vehicle 20 and includes instructions which are executed by the processor 24 to control the operation of the rail vehicle including the front and rear wheel assemblies.

Each of the front and rear wheel assemblies 26, 28 of the rail vehicle 20 include a pair of axles 34a, 34b and 36a, 36b supporting opposing sets of wheels 38a, 38b and 40a, 40b, and rail cylinders 42, 44 that are connected at one end to a wheel mount 46 and at an opposite end to a respective one of the axles 34a, 34b, 36a, 36b. The wheels 38a, 38b, 40a, 40b on the axles 34a, 34b, 36a and 36b are positioned on and traverse corresponding rails 48a, 48b of the railroad track 46. Typically, the wheels 38a, 38b, 40a, 40b are made of steel and are configured to be seated on and traverse the rails 48a, 48b. Adjustment of the axles 34a, 34b and 36a, 36b relative to the rails 48a, 48b is accomplished by adjusting the pressure generated by the rail cylinders 42, 44 on the axles and thereby the wheels 38a, 38b, 40a, 40b on the axles. In this regard, the rail cylinders 42, 44 are oriented at an angle $\theta$ between the wheel mount 44 and the respective axle 34a, 34b, 36a and 36b, and thereby do not act directly through the wheels 38a, 38b, 40a, 40b. Thus, the downward force acting on each wheel 38a, 38b, 40a, 40b by the pressure from the respective rail cylinder 42, 44 must be determined by taking into account the angle $\theta$ of the rail cylinders relative to the axle. To determine the actual downward force, the downward force generated by each rail cylinder 42, 44 is added to the weight of the axle and wheel assembly, i.e., the front and rear wheel assemblies 26, 28.

The formula for this calculation is:

$$TE=(GVW-GAW)*COF, \text{ where}$$

TE=Tractive Effort (lbs)
GVW=Gross Vehicle Weight (lbs)
GAW=Gross Axle Weight=AW (Axle Weight)*4 axles (lbs)
COF=coefficient of friction between rubber and steel $$AW=RGW+DRA$$

RGW=Rail Gear Weight (lbs)
DRA=Downward force of Rail Axle (lbs)
DRW=2*DRA (two wheels per axle)

DRW=Downward force of Rail Wheel (lbs)

$$=RCF*\cos(\theta)*PSC/PSRW$$

where,
RCF=Rail Cylinder Force=RP*CA (lbs)

RP=Rail Pressure (psi)
CA=Cylinder Area (in$^2$) $\theta$ (degrees), which is the rail cylinder angle from vertical PSC, i.e., the horizontal distance from the pivot shaft to the cylinder mount, and PSRW, i.e., the horizontal distance from the pivot shaft to the rail wheel.

It is important to note that the relationship of $\theta$, PSC, and PSRW change with the rail pressure. Therefore, at the very top and bottom ends of the rail pressure range, $\cos(\theta)*PSC/PSRW$ changes less than 1% from the nominal value. Accordingly, these variables, namely $\theta$, PSC and PSRW, are considered to be constant values. These constant values are described below and are vehicle specific.

The next step is to determine the relationship of the vertical force to the lateral force on each wheel 38a, 38b, 40a, 40b that is required to prevent wheel climb. This relationship is determined by using the Nadal formula, which is a standard formula used in the railroad industry. The Nadal formula follows:

$$(L/V)=((\tan(\delta)-\mu)/(1+\mu*\tan(\delta))$$

where:
L=Lateral load on the rail wheel
V=Vertical load on rail wheel
$\mu$=coefficient of friction (0.3 for steel on steel)
$\delta$=wheel flange angle (75 degrees for a new AAR narrow profile wheel. Note that this angle will increase as the wheel wears, making it harder for wheel climb to occur.

The Nadal formula above is applied to rail vehicles having wheel assemblies with non-fixed or floating axles.

Alternatively, the Wagner formula is used for rail vehicles having wheel assemblies with fixed axles. The Wagner formula is an extension of the Nadal formula and incorporates a phase angle to account for rail axles that are not perpendicular to the railroad track, i.e., at an angle relative to the railroad track.

Figure 7:
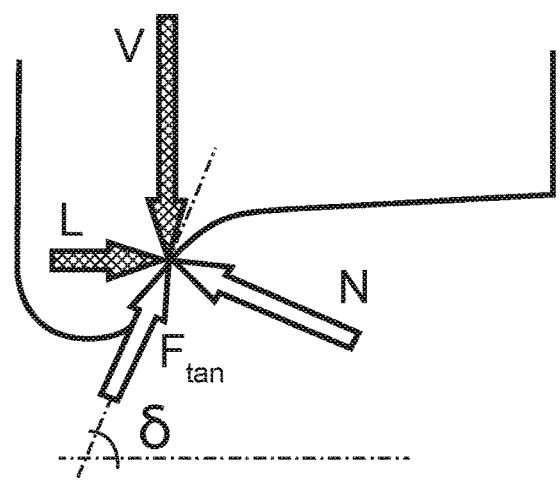
FIG. 7 is a schematic view of a wheel and a rail of the rail vehicle of FIG. 1 showing the force vectors on the wheel and the rail.

This formula is used, when one or more rail cars are coupled to the rail vehicle 20 and the rail vehicle and coupled rail car(s) traverse a designated curve of a railroad track, to determine the force vector angle of the wheels 38a, 38b, 40a, 40b on the railroad track. The magnitude of the force vector is equal to the tractive effort. Tractive effort (or drawbar pull) is the force exerted by the railcar mover. As shown in FIG. 7, the force vector is then broken into components, a lateral component and a vertical component, and these component forces are applied to the respective coupled axle. Since the specific dimensional data for each rail car is unknown, it is assumed that the largest or longest rail car is coupled to the rail vehicle to be conservative as the largest/longest rail car has the greatest force vector angle in a given curve of the railroad track. Conservatively, as discussed below, a car length of 55 feet with 9 foot overhangs is chosen for the formula, where longer rail cars create more lateral load.

In an example embodiment, the largest/longest rail car is 55 feet bogie to bogie wheelbase (distance between front and rear wheel assemblies with a coupler overhang of 9 feet. The force vector for this rail car is broken into lateral and vertical components and these components are applied to the coupled axle. Thus, the greater the tractive effort, the greater the lateral force.

The formula for lateral force is:

$$L=TE*\cos(\theta)/NRW$$

where
TE=Tractive Effort (lbs)

Θ=Angle of the rail axle to the force vector (determined by rail car geometry and angle of curvature of the railroad track)

NRW=Number of Rail Wheels sharing the lateral load

Next, L/V=1.62 [Lateral force component to the Vertical force component] to solve for V as a function of TE and Θ. The L/V is determined using the Nadal formula where δ=75° and μ=0.3. The result is Vr, which is the required vertical force to prevent wheel climb by the rail wheels on the railroad track. For each degree of track curvature, 0° through 45°, on the railroad track, and TE, the minimum required rail pressure is determined to prevent wheel climb. This is done by inputting a specific curve and iterating between rail pressures until the DRW=Vr.

Once the minimum rail pressure is correlated to degree of curvature, in an embodiment, a designated relative tractive effort value using the same conventional rail pressure is applied. This tractive effort value correlates to a designated "buffer" or factor of safety. This means that a rail vehicle and rail car having a designated length and overhang can enter a rail curve that is greater than the worst case rail curve discussed above before having the possibility of derailment. Rail cars having lengths that are shorter or less than the designated length, have a greater factor of safety.

The above formula and data provide the rail pressure required for each degree of curvature of a railroad track. This data is then applied to the degree of curvature of a designated railroad track. Thus, the processor 24 in the rail vehicle 20 must be able to determine and receive the degree of curvature of the railroad track as an input from the railroad track itself as the rail vehicle 20 traverses the railroad track. To do so, the steering position is correlated to the steering cylinder transducer output signal, in mV. Typically, the steering cylinder stroke is in a range from 20.13 to 29.63 inches. For example, at a 20.13 inch cylinder stroke, the transducer output is 1166 mV. At 29.63 inch cylinder stroke, the transducer output is 4829 mV. A perfect zero degree steering angle is at a steering cylinder length of 25.00 inches and a transducer output of 3046 mV. Using the rail vehicle 20 shown in FIG. 1 and the rail car describe above, the axle angle is determined relative to the frame for each degree of curvature of the railroad track. Next, a three-dimensional model of the front axle assembly is rotated to different axle angles to determine the cylinder lengths. The determined cylinder lengths are recorded and stored in a non-transitory recording medium disposed on the rail vehicle for each degree of curvature of the railroad track to be used in the following formulas.

The transducer output signal represented above is not gross millivolts, but rather the difference from steering center. The absolute value of the actual voltage output, in mV, is used, minus the straight value of 3046 mV to come up with a transducer signal that relates to rail curvature. As such, the angle of the rail curvature is important, and not the direction of the rail curvature.

Now, the rail pressure data for each degree of curvature, the transducer voltage for each degree of curvature, and the above Nadal formula are incorporated into a non-transitory computer readable medium disposed on the rail vehicle and in communication with the processor 24. This is done by plotting and storing rail pressure versus transducer voltage and adding a trendline in the memory device 30.

The above-referenced formulas are used by the processor 24 to relate the degree of curvature to the rail pressure on the railroad track for a designated railroad track.

Based on the above formulas, during operation of the rail vehicle 20, the processor 24 receives the angle curvature of the rails being traversed by the rail vehicle and any coupled rail cars, and the speed of the rail vehicle, and determines the minimum rail pressure on the wheels to maintain the stability of the rail vehicle and rail car(s) while the rail vehicle and rail car(s) are traversing the curved portion of the rails. If the rail pressure of the wheels on the rails is less than the minimum rail pressure to traverse the curved portion of the track, the processor 24 adjusts the rail pressure to be equal to or greater than the minimum rail pressure to maintain stability of the rail vehicle and/or rail car(s) while traversing the rails on the railroad track. Since this is a reactive system, and not a predictive system, a factor of safety is used to ensure the minimum rail pressure is never reached.

In the above embodiments, the rail vehicle includes a controller having a processor that communicates with the wheel assemblies of the rail vehicle to automatically control the rail pressure generated by the wheel assemblies on the rails to prevent wheel climb. It should be appreciated that any suitable controller and processor, such as a computer, a computer program disposed in the processor or other control device may be used to control and provide instructions to the front and rear wheel assemblies.

While a particular embodiment of the present rail pressure adjustment assembly and system has been described herein, it will be appreciated by those skilled in the art that changes and modifications may be made thereto without departing from the invention in its broader aspects and as set forth in the following claims.

What is claimed is:

1. A rail vehicle including a rail pressure control system, the rail vehicle comprising:
   a wheel assembly including wheels configured to traverse rails of a railroad track;
   a controller having a processor in communication with said wheel assembly; and
   a non-transitory computer readable medium, disposed on the rail vehicle, and containing instructions, which when executed by the processor, cause performance of the following steps in real-time as the rail vehicle traverses the rails:
   determine a rail pressure of said wheels on said rails;
   determine a degree of curvature of said rails as the rail vehicle moves along said railroad track;
   determine a minimum rail pressure of said wheels on said rails based on said degree of curvature;
   determine if the rail pressure is equal to or greater than said minimum rail pressure; and
   adjust the rail pressure of said wheels on said rails to be said minimum rail pressure when said rail pressure is less than said minimum rail pressure to maintain stability of the rail vehicle on said railroad track.

2. The rail vehicle of claim 1, wherein said wheel assembly includes rail cylinders, one of said rail cylinders being connected to a respective one of said wheels, said rail cylinders configured to adjust said rail pressure of said wheels on said rails, wherein said rail cylinders are in communication with said controller.

3. The rail vehicle of claim 1, wherein the rail vehicle is coupled to at least one rail car of a plurality of rail cars, said at least one rail car including at least one-wheel assembly with wheels that traverse the rails.

4. The rail vehicle of claim 3, wherein said at least one rail car has a length that is equal to or less than a length of each of said plurality of rail cars.

5. The rail vehicle of claim 1, further comprising a steering cylinder, wherein said controller determines the degree of curvature of said rails and a steering position.

6. The rail vehicle of claim 1, wherein said controller determines said rail pressure based on said degree of curvature of said rails and tractive effort ([Gross Vehicle Weight−Gross Axle Weight]*Coefficient of Friction) of said wheel assembly.

7. A method of adjusting the rail pressure of wheels of a rail vehicle on a railroad track during movement of the rail vehicle, the method comprising automatically performing the following steps:
determining a rail pressure of the wheels on rails of the railroad track;
determining a degree of curvature of the rails as the rail vehicle traverses the railroad track;
determining a minimum rail pressure of the wheels on the rails based on said degree of curvature;
determining if the rail pressure is equal to or greater than said minimum rail pressure; and
adjusting the rail pressure of the wheels on the rails to be said minimum rail pressure when said rail pressure is less than said minimum rail pressure to maintain stability of the rail vehicle on the railroad track.

8. The method of claim 7, wherein determining the rail pressure of the wheels on the rails includes determining a downward force on the wheels generated by pressure from rail cylinders connected to the wheels.

9. The method of claim 7, wherein adjusting the rail pressure of the wheels on the rails includes adjusting the pressure of the rail cylinders on the wheels.

10. The method of claim 7, further comprising coupling at least one rail car to the rail vehicle, wherein said at least one rail car has a length that is equal to or less than a length of any additional rail cars coupled to the rail vehicle.

11. The method of claim 7, wherein adjusting the rail pressure of the wheels on the rails includes adjusting a pressure of a rail cylinder attached to an axle supporting said wheels.

\* \* \* \* \*